United States Patent [19]

Maruyama et al.

[11] 4,441,797

[45] Apr. 10, 1984

[54] ELECTRONIC FLASH DEVICE CAPABLE OF AUTOMATICALLY CONTROLLING THE QUANTITY OF A FLASH OF LIGHT

[75] Inventors: Yuji Maruyama; Katsumi Horinishi, both of Osaka, Japan

[73] Assignee: West Electric Co., Ltd., Osaka, Japan

[21] Appl. No.: 449,610

[22] Filed: Dec. 14, 1982

[30] Foreign Application Priority Data

Dec. 14, 1981 [JP] Japan .............................. 56-186940[U]
Dec. 14, 1981 [JP] Japan .............................. 56-186941[U]
Dec. 14, 1981 [JP] Japan .............................. 56-186944[U]

[51] Int. Cl.³ ............................................. G03B 15/05
[52] U.S. Cl. ...................................... 354/416; 354/484
[58] Field of Search ....................... 354/23 D, 33, 60 F

[56] References Cited

U.S. PATENT DOCUMENTS

| | | | |
|---|---|---|---|
| 4,274,722 | 6/1981 | Nomata | 354/33 |
| 4,275,953 | 6/1981 | Watanabe et al. | 354/33 |
| 4,285,582 | 8/1981 | Yamazaki | 354/23 D |
| 4,294,528 | 10/1981 | Ohta et al. | 354/60 F |
| 4,379,983 | 4/1983 | Takematsu | 354/33 |

*Primary Examiner*—Russell E. Adams
*Attorney, Agent, or Firm*—Burgess, Ryan & Wayne

[57] ABSTRACT

An electronic flash device capable of automatically controlling the quantity of a flash of light or a flash duration in response to the intensity of light reflected from a subject, is provided with a means which is responsive to an electrical signal, which is derived from a camera or an arithmetic circuit incorporated in the electronic flash device and represents one of a plurality of f numbers which is selected, so as to control a flash light control means which in turn, for instance, determines a flash duration of a flash lamp and hence the quantity of a flash of light emitted therefrom. Therefore, the quantity of a flash of light can be controlled in steps equal in number to f numbers which can be selected.

4 Claims, 1 Drawing Figure

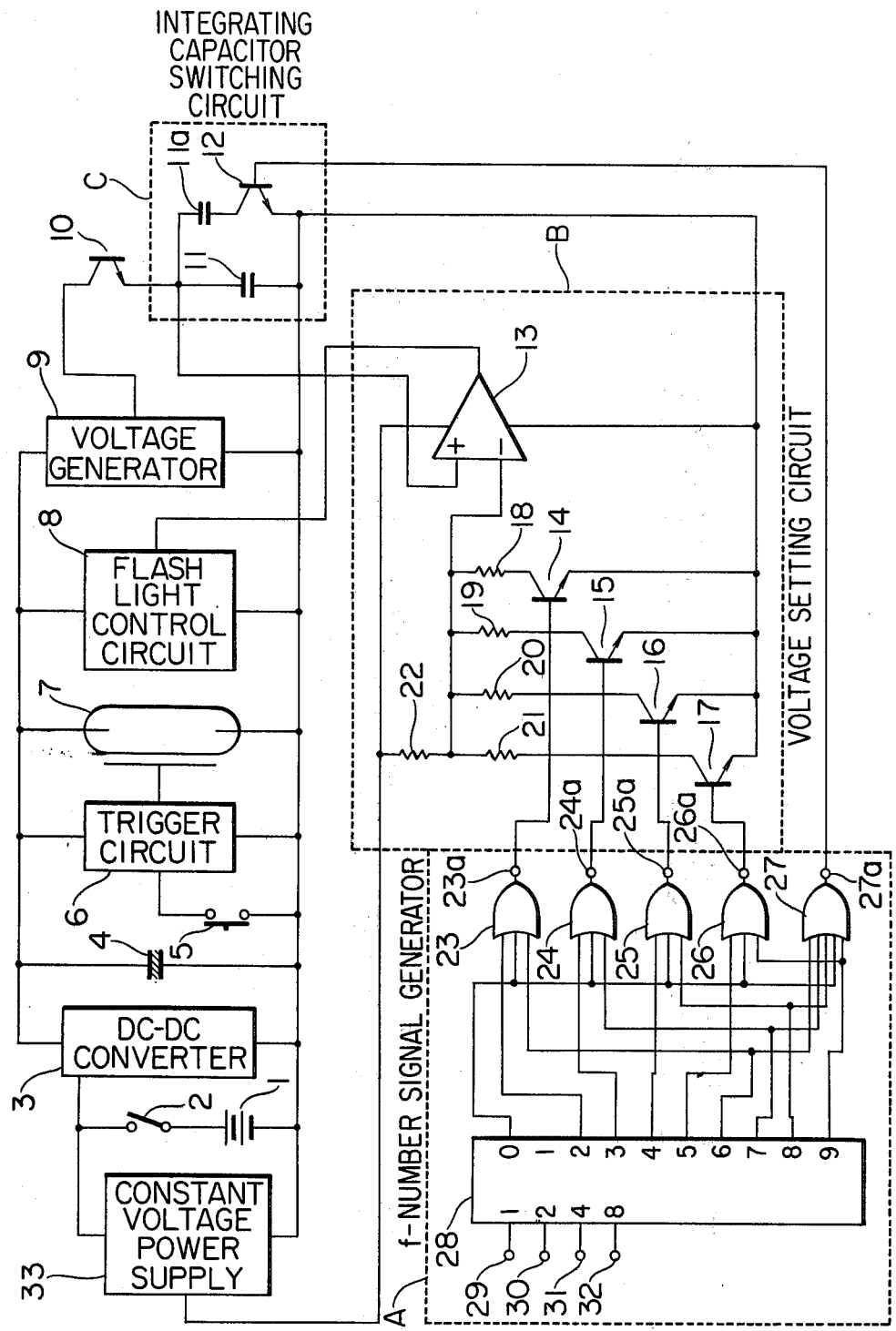

ELECTRONIC FLASH DEVICE CAPABLE OF AUTOMATICALLY CONTROLLING THE QUANTITY OF A FLASH OF LIGHT

BACKGROUND OF THE INVENTION

The present invention relates to an electronic flash device capable of automatically controlling the quantity of a flash of light.

The conventional electronic flash devices capable of controlling the quantity of a flash of light may be generally divided into two types. In one type, an electronic flash device is organically combined with a camera so that the quantity of a flash of light can be controlled in response to electrical signals representative of exposure factors and in the other type, the quantity of a flash of light is controlled in response to signals which are derived from an arithmetic circuit incorporated in the flash device and which represent exposure factors.

In general, the electrical signal derived from the camera or the arithmetic circuit represents an f number or aperture selected. Therefore, the quantity of a flash of light is automatically controlled in response to a selected f number.

That is, with the conventional electronic flash devices capable of controlling the quantity of a flash of light, a signal from a camera or an arithmetic circuit is converted into a voltage signal which is applied as a reference voltage to one of the two input terminals of a comparator. Another voltage obtained by the integration of the photocurrent flowing through a photosensor is applied to the other input terminal. The two voltage signals are compared and in response to the difference between them, the quantity of a flash of light is controlled. This is the most widely used system for controlling the quantity of a flash of light.

Such control system as described above, however, has the problem that the quantity of a flash of light cannot be controlled in a plurality of steps because of a limited range of variation in reference voltage applied to the comparator. In other words, the conventional electronic flash devices cannot control the quantity of a flash of light depending upon a plurality of f numbers.

SUMMARY OF THE INVENTION

The present invention was made to overcome the above and other problems encountered in the conventional electronic flash devices.

The primary object of the present invention is therefore to provide an electronic flash device capable of automatically controlling the quantity of a flash of light which incorporates therein a means for controlling a flash light control means (which determines a flash duration) in response to an electrical signal representative of one of a plurality of f numbers which is preselected, the electrical signal being derived from a camera or an arithmetic circuit.

An electronic flash device in accordance with the present invention which is capable of automatically controlling the quantity of a flash of light, is provided with a means for controlling the operation of a flash light control means (which, for instance, determines a flash duration and hence the quantity of a flash of light emitted from a flash lamp) in response to an electrical signal which is derived from a camera or an arithmetic circuit incorporated in the electronic flash device and which represents one of a plurality of f-numbers which is selected; and a means which is adapted to produce a plurality of electrical signals which represents a plurality of f numbers and which are applied to said first-mentioned means.

BRIEF DESCRIPTION OF THE DRAWING

A single FIGURE illustrates an electric circuit diagram of a preferred embodiment of the present invention.

DESCRIPTION OF THE PREFERRED EMBODIMENT

Referring to the single FIGURE, reference numeral 1 denotes a DC power supply; 2, an ON-OFF switch; 3, a conventional DC-DC converter comprising an oscillator transistor, an oscillator transformer and so on (which are not shown); 4, a main flash capacitor; 5, a trigger switch operatively connected to a sync-switch of a camera (not shown); 6, a trigger circuit comprising a trigger capacitor, a trigger transformer and so on (which are not shown); 7, a flash lamp which converts the energy stored on the main flash capacitor 4 into light; 8, a flash light control circuit; that is, a circuit adapted for controlling the quantity of light emitted from the flash lamp 7; 9, a voltage generator which is adapted to produce a predetermined value of voltage simultaneous with the firing of the flash lamp 7; 10, a photosensor; 11 and 11a, integrating capacitors which are adapted to be charged by the photocurrent flowing through the photosensor 10; 12, a switching transistor; 13, a capacitor; 14–17, switching elements or transistors; 18–22, resistors; 33–26, three-input OR gates; 27, a five-input OR gate; 28, a decoder; 29–32, input terminals of the decoder 28 to which are applied binary coded signals from an arithmetic circuit (not shown) or from a camera (not shown), each of the binary coded signals representing an f number selected; and 33, a fixed voltage circuit.

Next, the mode of operation will be described. When the ON-OFF switch 2 is closed, the power supply 1 is connected to the DC-DC converter 3. The DC-DC converter 3 steps up the voltage of the power supply 1 in a manner well known in the art to charge the main flash capacitor 4 and the trigger capacitor (not shown). When the trigger switch 5 is closed after the main flash capacitor 4 has been charged to a predetermined level, the flash lamp 7 is triggered by the trigger circuit 6 and converts the energy stored on the main flash capacitor 4 into light, thereby illuminating a subject to be photographed.

According to the present invention, the flash light control circuit 8 controls the quantity of light emitted from the flash lamp 7 or flash duration. To this end, the present invention provides an f-number signal generator which is generally indicated by the reference character A and which comprises the decoder 28 and the OR gates 23–27; a voltage setting circuit which is generally indicated by the reference character B and which comprises the transistors 14–17, resistors 18–22 and the comparator 13, whereby in response to the output from the f-number signal generator A, a voltage signal of a predetermined value corresponding to a selected f number is produced; and an integrating capacitor-switching circuit which is generally indicated by the reference numeral C and which comprises the integrating capacitors 11 and 11a and the transistor 12, whereby in response to the output signal from the f-number signal generator A, either of the integrating capacitor 11 or 11a is selected.

The camera or arithmetic circuit (not shown) is adapted to convert a selected aperture or f number into a binary coded signal which is applied to the input terminals 29–32 of the decoder 28 so that the following outputs are derived from the outputs of the OR gates 23–27:

TABLE

| f number | 23a | 24a | 25a | 26a | 27a |
|---|---|---|---|---|---|
| 1.4 | H | L | L | L | L |
| 2.0 | L | H | L | L | L |
| 2.8 | L | L | H | L | L |
| 4.0 | L | L | L | H | L |
| 5.6 | H | L | L | L | H |
| 8.0 | L | H | L | L | H |
| 11 | L | L | H | L | H |
| 16 | L | L | L | H | H |
| M | H | H | H | H | H |

Remarks: H and L denote binary states; that is, H represents a high level while L, a low level.

Thus, it is apparent that in response to a selected f number which is coded into a binary coded signal, a predetermined combination of H and L signals is derived from the outputs of the OR gates 23–27 as shown in the above TABLE.

In the above TABLE, M denotes a manually controlled flash operation in which the flash light control circuit 8 is disabled and the photosensor 10 is disconnected from the circuit shown in the single FIGURE so that the outputs from all the OR gates 23–27 are all H as shown in the above TABLE. However, it is to be understood that the present invention is not limited to the above-described combination of all H.

In response to the output from the f number signal generator A, the voltage setting circuit B varies the reference voltage applied to the comparator 13 and in response to the output from the comparator 13 the flash light control circuit 8 controls the quantity of light emitted from the flash lamp 7 so that an optimum flash exposure can be ensured in response to a selected f number as will be described in more detail below.

The outputs from the OR gates 23–26 are connected to the bases, respectively, of the transistors 14–17 so that a voltage derived from a combination of resistors 18–22 is applied to the inverting input terminal (−) of the comparator 13. That is, the output voltage $V_o$ of the constant voltage source 33 is divided by the resistors 18–22 and applied to the inverting input terminal (−) of the comparator 13.

For instance, assume that the pre-selected f number is 1.4 and the binary coded signal representative of f/1.4 is applied to the input terminals 29–32 of the decoder 28. Then, as seen from the above TABLE, the H signal is derived only from the OR gate 23 or its output terminal 23a. As a result, only the transistor 14 is turned on and consequently the voltage given by $$V_o \times R_{18}/(R_{22}+R_{18})$$

where $R_{18}$ and $R_{22}$ are resistance values, respectively, of the resistors 18 and 22 is applied as a reference voltage to the inverting input terminal (−) of the comparator 13.

In the case of f/2.0, the H signal is derived only from the OR gate 24 so that only the transistor 15 is turned on. As a result, a reference voltage given by $$V_o \times R_{19}/(R_{22}+R_{19})$$

where $R_{19}$ is the resistance value of the resistor 19 is applied to the inverting input terminal (−) of the comparator 13.

In the case of f/2.8, a reference voltage given by $$V_o \times R_{20}/(R_{22}+R_{20})$$

where $R_{20}$ is the resistance value of the resistor 20 is applied to the inverting input terminal (−) of the comparator 13 since the H signal is derived only from the OR gate 25.

In like manner, in the case of f/4.0, a reference voltage given by $$V_o \times R_{21}/(R_{22}+R_{21})$$

where $R_{21}$ is the resistance value of the resistor 21 is applied to the inverting input terminal (−) of the comparator 13.

It is now apparent that in response to a selected f number, which is converted into a binary coded signal, a predetermined reference voltage is applied to the inverting input terminal (−) of the comparator 13 if the output voltage $V_o$ and the resistance values of the resistors 18–22 are suitably selected. Therefore, the output of the comparator 13 is dependent on the difference between the variable reference signal applied to the inverting input terminal (−) and the signal applied to the noninverting input terminal (+) of the comparator 13 and in response to the output therefrom the flash light control circuit 8 controls the quantity of light emitted from the flash lamp 7.

As is apparent from the above TABLE, the transistors 14–17 are turned on for different preselected f numbers. For instance, the transistor 14 is turned on in the cases of f/1.4 and f/5.6. However, it should be noted that the output of the OR gate 27 is different. For instance, in the cases of f/1.4 and f/5.6, the transistor 14 is turned on, but in the case of f/1.4, the output of the OR gate 27 is L or at a low level while in the case of f/5.6, the output of the OR gate 27 is H or at a high level. In response to the output from the OR gate 27, the integrating capacitor-switching circuit C is controlled. Therefore, even if the same transistors, for instance, 14 is turned on for different f numbers, the different outputs can be derived from the comparator 13.

In other words, the combinations of the outputs H and L from the OR gates 23, 24, 25 and 26 may be repeated, but the combinations of the outputs from the five OR gates 23 through 27 are all different. And in response to the combinations of the outputs from these five OR gates 23 through 27, the output from the comparator 13 varies to control the flash light control unit 8.

In the integrating capacitor-switching circuit C, the first integrating capacitor 11 is connected in parallel with a series circuit consisting of the second integrating capacitor 11a and the transistor 12. The base of the transistor 12 is connected to the output terminal 27a of the OR gate 27, so that if the output from the OR gate 27 is L, the transistor 12 is turned off and consequently the photosensor 10 is connected only to the first integrating capacitor 11. On the other hand, when the output from the OR gate 27 is H, the transistor 12 is driven into the conduction state, the photosensor 10 is connected to both the first and second integrating capacitors 11 and 11a which are in turn connected in parallel.

Therefore, when the output from the OR gate 27 is L, so that the transistor 12 is driven into the nonconduction state, the photocurrent from the photosensor 10 charges only the first integrating capacitor 11 and the voltage charged across it is applied to the noninverting terminal (+) of the comparator 13. However, when the output from the OR gate 27 is H so that the transistor 12 is driven into the conduction state, the photocurrent from the photosensor 10 charges both the first and second integrating capacitors 11 and 11a and the voltage across them is applied to the noninverting input terminal (+) of the comparator 13. Thus, the voltage applied to the noninverting input terminal (+) of the comparator 13 varies depending upon whether the output from the OR gate 27 is H or L that is, whether the transistor 12 is turned on or off.

As shown in the above TABLE, the output from the OR gate 27 is low or L in the case of f/1.4, f/2.0, f/2.8 or f/4.0 but it is high or H in the case of f/5.6, f/8.0, f/11 or f/16. Thus, the output from the comparator 13 varies depending upon the combinations of the outputs from the OR gates 23-27.

From the above TABLE, it is seen that the same reference potentials are applied to the inverting input terminal (−) of the comparator 13 in the cases of f/1.4 and f/5.6; f/2 and f/8; f/2.8 and f/11; and f/4.0 and f/16, but the voltage across the first integrator 11 or across both the first and second integrators 11 and 11a which are connected to the photosensor 10 varies as described above and consequently the output from the comparator 13 which controls the flash light control circuit 8 varies.

Therefore, the operation of the flash light control circuit 8 is determined in response to the combinations of the four different reference voltages applied to the inverting input terminal (−) of the comparator 13 and the two voltages applied from the integrating capacitor-switching circuit C. That is, the flash light control circuit 8 can respond to eight control signals and consequently can control the quantity of light emitted from the flash lamp 7 in 8 steps depending upon a selected f number or aperture.

Since the flash light control circuit 8 does not constitute the present invention, no detailed description thereof shall be made in this specification. It suffices to control the quantity of light emitted from the flash lamp 7. For instance, it may be of the conventional type in which the charge stored on the main flash capacitor 4 can be bypassed or in which the conversion of the energy stored in the main flash capacitor 4 into light can be interrupted.

The constant-voltage power supply 33 is provided in order to compensate for variations in voltage of the DC power supply 1, but it may be eliminated when a power supply independent from the DC power supply 1 is provided so as to provide a reference voltage to the comparator 13.

What is claimed is:

1. An electronic flash device capable of automatically controlling the quantity of a flash of light in response to a preselected f number of a camera comprising
    (a) a flash lamp which is connected to a main flash capacitor and which is adapted to convert the energy stored on said main flash capacitor into light,
    (b) a comparator with a first input terminal to which is applied a reference voltage and a second input terminal to which is applied a voltage derived from an integrator means which is adapted to totalize the photocurrent flowing through a photosensor means which in turn responds to the intensity of light reflected back from a subject,
    (c) a flash light control circuit which is responsive to the electrical signal derived from said comparator so as to extinguish said flash lamp,
    (d) an f number signal generator means which receives binary coded signals, each representing each of a plurality of f-numbers, from a camera or an arithmetic circuit incorporated in said electronic flash device and which is adapted to convert the received binary coded signal into a coded signal representative of the received binary coded signal which in turn represents a selected f number,
    (e) a control circuit for controlling said flash light control circuit which receives the coded output signal from said f number signal generator means and which produces said reference voltage which corresponds to said received coded output signal, and
    (g) an integrating capacitor-switching circuit which responds to the coded output signal from said f number signal generator means so as to select a combination of a plurality of capacitors of an integrator means corresponding to said coded output signal received,
whereby, the control signal to be applied to said flash light control circuit can be varied in response to said selected f number.

2. An electronic flash device capable of automatically controlling the quantity of a flash of light as set forth in claim 1 further comprising
    said f number signal generator means comprising
        a decoded means which receives said binary coded signal, and
        a plurality of OR gates which are connected to the output terminals of said decoder means and which are adapted to produce high- or low-level signals.

3. An electronic flash device capable of automatically controlling the quantity of a flash of light as set forth in claims 1 and 2 further comprising
    said control circuit for controlling said flash light control circuit comprising
        a plurality of switching elements which are connected to the output terminals, respectively, of OR gates in said f number signal generator means; and
        a plurality of second resistors which are electrically connected to said switching elements, respectively, and which are electrically connected through a first resistor to a reference voltage source means when their corresponding switching elements are turned on,
whereby the voltage of said reference voltage source is divided by a combination of said first resistor and one or more of said plurality of second resistors and applied to said comparator means as a reference voltage.

4. An electronic flash device capable of automatically controlling the quantity of a flash of light as set forth in claim 1, further comprising
    said integrating capacitor-switching circuit comprising
        a first integrating capacitor which is connected in series to said photosensor means,
        a second integrating capacitor which is connected in parallel with said first integrating capacitor, and
        a switching means which is connected in parallel with said first integrating circuit and in series with said second integrating circuit and adapted to be driven into the conduction or nonconduction state in response to the coded output signal from said f number signal generator means.

* * * * *